United States Patent [19]

Carlson

[11] Patent Number: 4,941,766
[45] Date of Patent: Jul. 17, 1990

[54] TILT WHEEL UNIVERSAL

[75] Inventor: John Carlson, Wayne, Pa.

[73] Assignee: Teleflex Incorporated, Limerick, Pa.

[21] Appl. No.: 240,439

[22] Filed: Sep. 2, 1988

Related U.S. Application Data

[63] Continuation of Ser. No. 943,500, Dec. 19, 1986, abandoned.

[51] Int. Cl.⁵ .................... F16D 3/16; B62D 1/18
[52] U.S. Cl. .................... 403/131; 403/141; 403/150; 464/110; 464/112; 464/150; 74/493
[58] Field of Search .............. 403/131, 128, 135, 140, 403/114, 115, 141, 143, 76, 57, 58, 98, 142, 122, 90, 84, 77, 150, 151, 306, 74, 125, 161; 464/112, 122, 152, 150, 153, 110; 74/493, 540; 280/775

[56] References Cited

U.S. PATENT DOCUMENTS

| | | | |
|---|---|---|---|
| 771,457 | 10/1904 | Bullard | 403/131 X |
| 1,143,571 | 6/1915 | Cooper | 464/152 |
| 1,434,443 | 11/1922 | Kuhn | 464/150 |
| 1,839,602 | 1/1932 | Shakely | 464/110 |
| 2,076,028 | 4/1937 | Hufferd | 403/131 |
| 2,104,101 | 1/1938 | Rosenbaum | 464/112 |
| 2,705,163 | 3/1955 | Marquis | 403/140 |
| 2,740,270 | 4/1956 | Schnuck | 464/110 |
| 3,068,032 | 12/1962 | Van Winsen | 403/150 X |
| 3,091,484 | 5/1963 | Laupot | 403/57 X |
| 3,895,501 | 7/1975 | Holmes | 464/122 X |
| 4,274,268 | 6/1981 | Taig | 403/131 X |
| 4,274,269 | 6/1981 | Trabue | 403/306 X |
| 4,317,338 | 3/1982 | Jordan | 403/131 X |
| 4,516,440 | 5/1985 | Nishikawa | 74/493 |

Primary Examiner—Peter M. Cuomo
Attorney, Agent, or Firm—Reising, Ethington, Barnard, Perry & Milton

[57] ABSTRACT

A universal joint for use in an automobile tilt wheel assembly includes a first (12) and second (28) shaft. The end of the first shaft (12) includes a pin (20) extending on opposite sides of the first shaft (12). A pair of caps (22) having a circular outer periphery are rotatably disposed on the pin (20). Two socket member halves (34) interconnect the first shaft (12) and the second shaft (28). The socket members (34) define a circular pocket (36) for receiving the first end of the first shaft (12). The socket members (34) mate in a plane containing the axis of the pin (20). The socket members (34) define an outwardly flared recess (40, 41) to accommodate the sides (17) of the first shaft (12) during rotational movement of the cap members (22) in the circular pocket (36) and to accommodate movement of the first shaft (12) about the axis of the pin (20).

16 Claims, 3 Drawing Sheets

TILT WHEEL UNIVERSAL

This application is a continuation, of application Ser. No. 943,500, filed 12-19-86.

TECHNICAL FIELD

This invention relates to a universal joint, and more specifically to a universal joint for use in a vehicle steering assembly.

BACKGROUND ART

A steering assembly typically includes a steering shaft directly coupled by a spline, or the like, to a steering wheel. Such a straight connection requires no universal joint. It has become desirable to include in steering assemblies the option of tilting the wheel in a vertical plane to adjusted positions for the comfort of the driver. This option requires use of a universal joint for rotation of a steering wheel shaft with respect to the steering shaft when the two shafts are disposed angularly with respect to one another.

One such steering assembly uses a universal joint having a molded or integrated cavity for receiving the wheel shaft. Insertion of the shaft into the cavity is accomplished by sliding each of two cap members along the shaft, one at a time and into the cavity by pivoting the shaft to either side. The caps are secured to the wheel first shaft by a pin which creates a circular end. Manufacture of this type of assembly is difficult with respect to the joint cavity. This type of assembly is shown in U.S. Pat. No. 4,317,338 granted Mar. 2, 1982 in the name of David D. Jordan wherein a molded joint receives multiple parts to comprise a universal joint assembly.

SUMMARY OF THE INVENTION AND ADVANTAGES

The subject invention provides universal joint assembly for use in a steering wheel assembly. The assembly comprises a first shaft having a first universal end and a second shaft having a second universal end. The first universal end includes oppositely disposed faces with the pin extending from each of the faces. Cap members are rotatably disposed on the pins and in facing relationship to the faces for allowing relative rotational movement about the axis of the pins between the first and second cap members. The cap members are semicircular away from the faces in the plane containing the axis of the pin. The assembly is characterized by socket members clamped about the second universal end of the second shaft and including a circular pocket disposed about the cap members for limiting movement of the cap members in the plane relative to the socket members so that the universal movement between the shafts occurs as the circular cap members rotate in the pocket along with the pin and relative rotation occurs about the axis of the pin between the first shaft and cap members at the faces.

An advantage of this assembly includes the use of the two socket members which makes assembly and manufacture of the universal joint simple.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
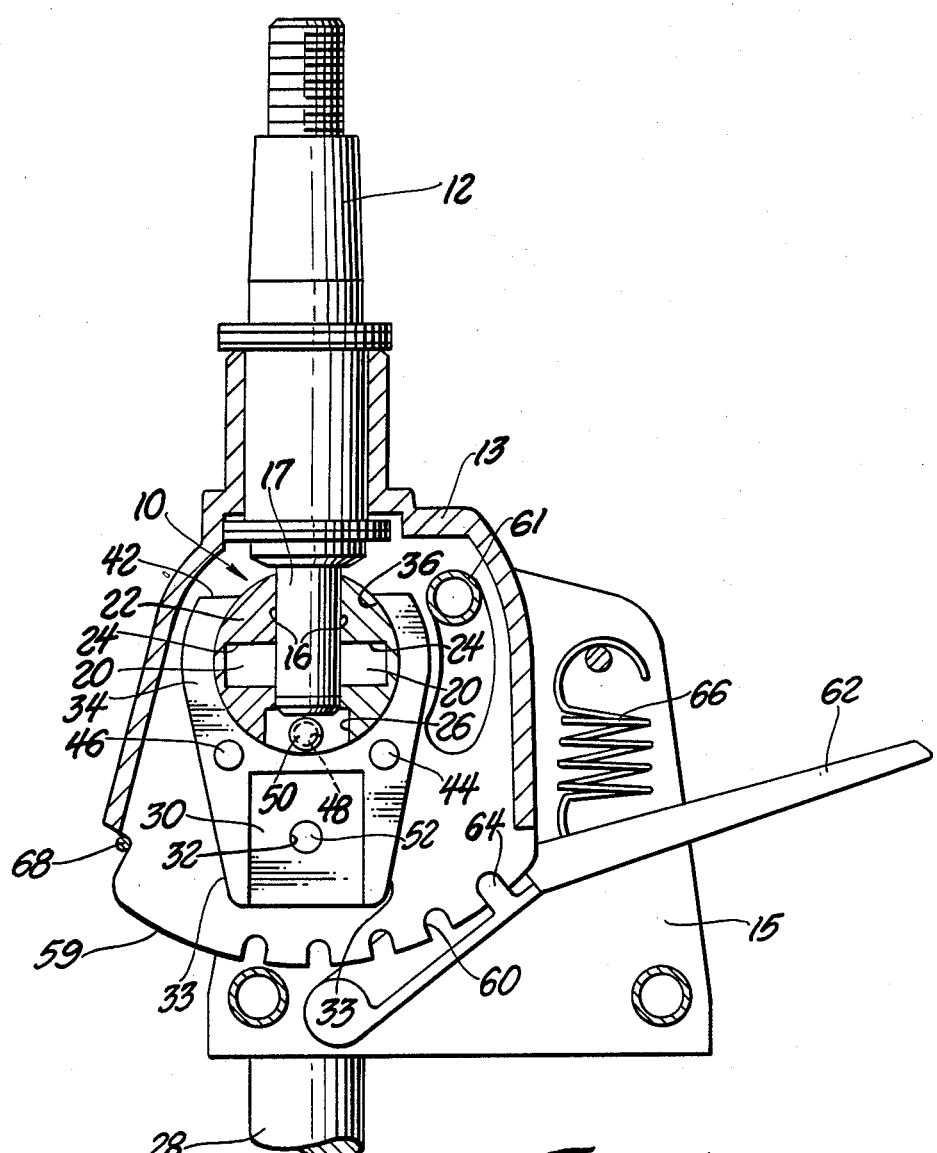
FIG. 1 is a cross-sectional view of the preferred embodiment of the subject invention.
Figure 2:
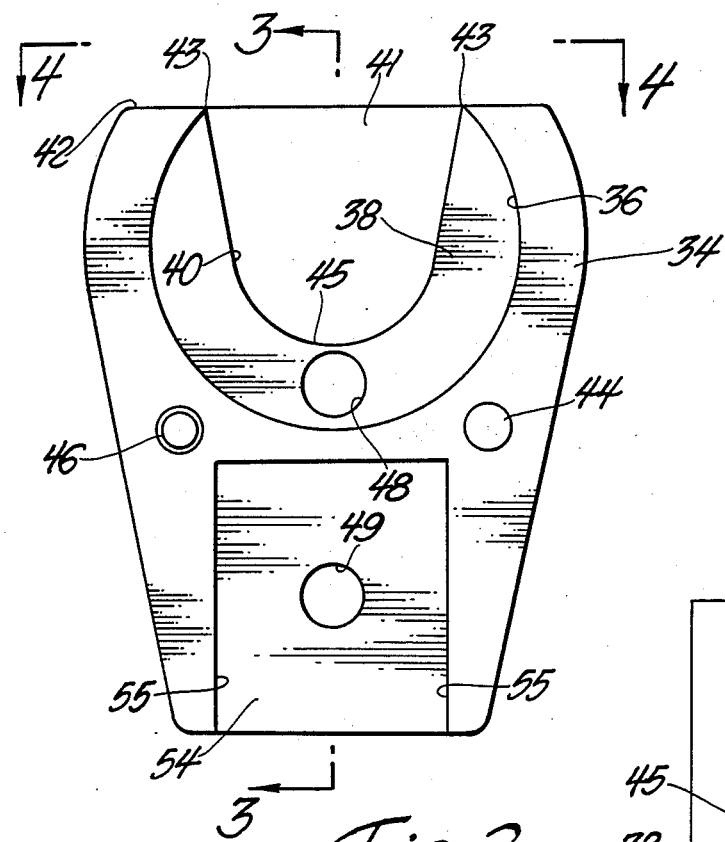
FIG. 2 is an elevational view of the inside face of one of the halves of the socket.
Figure 4:
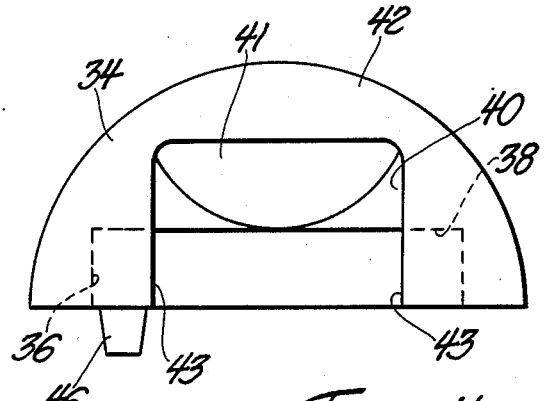
FIG. 4 is an end view of the socket taken substantially along lines 4—4 of FIG. 2.
Figure 3:
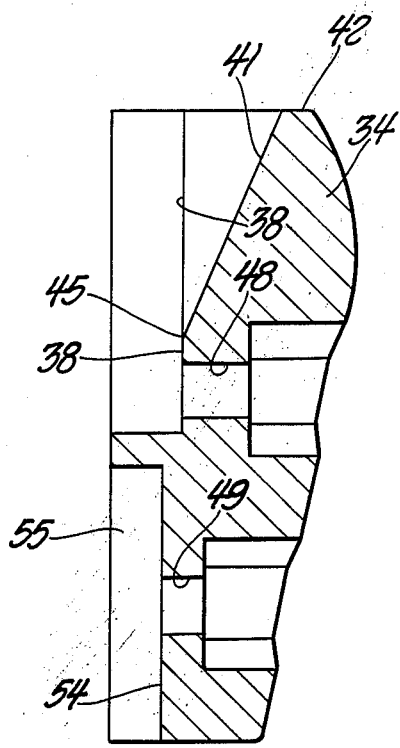
FIG. 3 is a fragmentary cross-sectional view of the socket taken substantially along lines 3—3 of FIG. 2.
Figure 5:
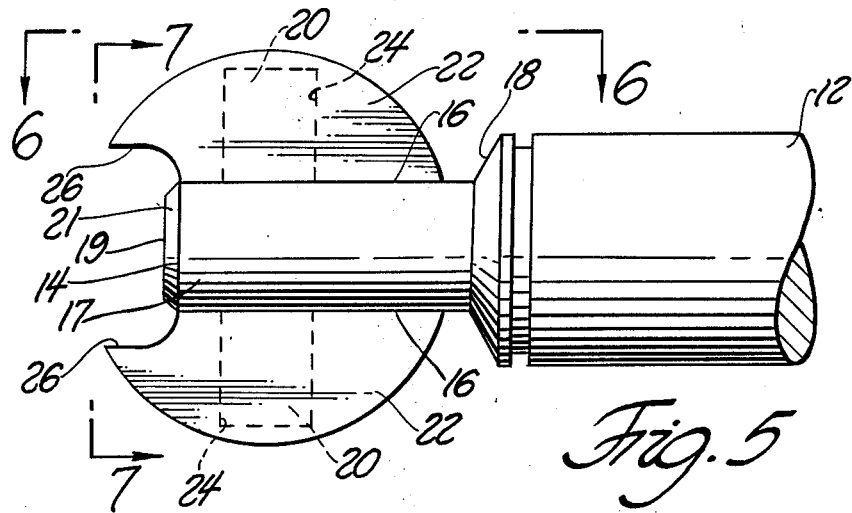
FIG. 5 is a side view of the first universal end, i.e., the steering shaft end.
Figure 6:
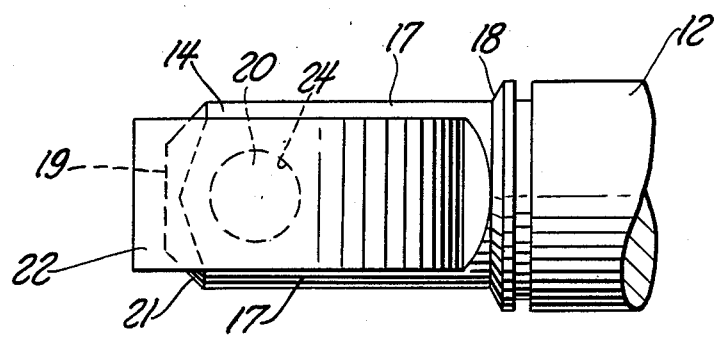
FIG. 6 is a view of the first universal end taken substantially along lines 6—6 of FIG. 5.
Figure 7:
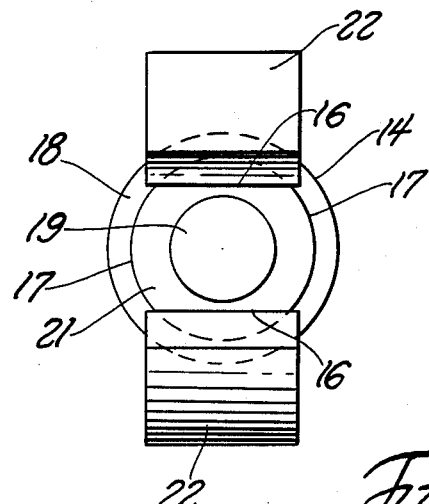
FIG. 7 is an end view of the first universal end taken substantially along lines 7—7 of FIG. 5.

A universal joint assembly for use in a steering wheel assembly is generally shown at 10 in FIG. 1.

The assembly 10 includes a first steering or wheel shaft 12 having a first universal end 14. The wheel shaft 12 is rotatably supported in a bracket 13 which is in turn pivotally mounted in a housing 15 for tilting movement about an axis extending through the universal joint 10. The first universal end 14 of shaft 12 includes oppositely disposed flat faces 16 with rounded sides 17 extending between the faces 16. The first end 14 contains a pin hole extending therethrough out to each of the oppositely disposed faces 16 in which a pin 20 is press fit or otherwise fixed, the ends of which extend away from each of the faces 16. The lower portion of end 14 includes an annular frustoconical flange 18 and the circular distal tip 19 is champered at 21.

The assembly 10 includes cap members 22 which are semicircular and contain a bore 24 on the diameter thereof and into the cap members 22. In other words, the caps have circular outer peripheries which extend away from and intersect the faces 16 in the plane containing the longitudinal or center axis of the pin 20. The cap members 22 are rotatably disposed on the pin 20 and in facing relationship to the faces 16 for allowing relative rotational movement about the axis of the pin 20 between the first shaft 12 and the cap members 22.

The cap members 22 are semicircular away from the faces 16 in the plane containing the axis of the pin 20. The cap members 22 include spaced and parallel flat sides perpendicular to the faces 16. The sides 17 of the first universal end 14 extend laterally outward from the flat sides of the cap members 22. The cap members 22 include reliefs 26 at the distal tip or end 19 of the first shaft 12 for defining a clearance for pivotal movement, explained more fully hereinafter.

The assembly 10 also includes a second or steering shaft 28 having a second universal end 30. The second universal end 30 has an end generally rectangular in cross-section and containing a securing hole 32 extending therethrough. The end 30 is generally rectangular because it has rounded sides 33.

The assembly 10 is characterized by socket members 34 which interconnect the first shaft 12 and the second shaft 28. The socket members 34 define a circular pocket 36 which is disposed about the cap members 22 for limiting movement of the cap members 22 so that universal movement between the first 12 and second 28 shafts occur as the cap members 22 rotate in the circular pocket 36 along with the pin 20. Relative rotation also occurs about the axis of the pin 20 between the first shaft 12 and the cap members 22 at the faces 16. The configuration of each socket member 34 is identical which allows manufacturing to be simple.

The socket members 34 mate in a plane containing the axis of the pin 20. The circular pocket 36 includes flat bottoms 38 in sliding engagement with the flat sides of the cap members 22. The socket members 34 generally define a outwardly flared recess 40 and 41 which extends into the flat bottoms 38 of the circular pocket 36 to accommodate the sides 17 of the first shaft 12 during rotational movement of the cap members 22 in the circular pocket 36 and to accommodate movement of the first shaft 12 about the axis of the pin 20.

The socket members 34 present an upper surface 42 and the circular pocket 36 intersects and terminates on a line 43 at the upper surface 42 on a chord of the circle thereof for retaining the cap members 22 therein. The flared recess 40 and 41 intersects the upper surface 42 at the intersection 43 of the circular pocket 36 and the upper surface 42. The flared recess 40 and 41 includes the side ramps 41 which slope downwardly and inwardly from the upper surface 42 to intersect the bottoms 38 of the pockets 36 on a circular line 45.

The socket members 34 include guide means 44 and 46 for aligning the socket members 34 during assembly 10 and to prevent relative angular movement therebetween. The guide means 44 and 46 include a guide pin 44 disposed laterally of the pocket 36 on each socket member 34 and a guide hole 46 on the opposite side of each socket member 34 for receiving the guide pin 44 of the other socket member 34. The guide pin 44 is disposed in the guide hole 46 of the mating socket member when assembled.

The assembly 10 further includes fastener hole means 48 and 49 and fastener means 50 and 52 for securing the socket members 34 together. The fastener means 50 and 52 includes a first fastener 50 interconnecting and holding the socket members 34 together about the cap members 22. The first fastener 50 extends through the fastener hole 48 at the bottom of the circular pocket 36 and through the opposing bottom 38 thereof. The reliefs 26 in the cap members 22 define a clearance about the first fastener 50 for allowing rotational movement of the cap members 22. The socket members 34 are clamped about the second universal end 30 of the second shaft 28. The socket members 34 include a pocket with flat sides 54 and rounded ends 55 for receiving the end 30 of second shaft 28. The generally rectangular pocket includes the rounded ends 55 complementary with the rounded 33 end 30 of the second shaft 28. The socket members 34 include a second fastener hole 49 extending through the flat sides 54 of the rectangular pocket in the socket members 34. The fastener means 50 and 52 includes a second fastener 52 for independently connecting the socket members 34 to the second shaft 28. The second fastener 52 extends through the second fastener hole 49 and the securing hole 32. The mating rounded side surfaces 33 and 55 extend in the direction of the second fastener 52.

The assembly 10 is easily assembled and is as follows. The pin 20 is inserted within the first shaft 12. The cap members 22 are then placed about the pin 20 against the faces 16. The socket member 34 are then secured about the cap members 22 and secured by the first fastener 50. The second rectangular end 30 of second shaft 28 may then be inserted in the rectangular pocket 54 and secured by the second fastener 52. The historically complex parts are now easily manufactured and assembled. The socket members 34 are identical in shape as are the cap members 22.

The specific embodiment as shown in FIG. 1 is for use as a tilt wheel steering assembly 10. The first shaft 12 is connected to a steering wheel, not shown. The second shaft 28 is connected to the steering gear, also not shown. The bracket 13 surrounds the universal joint assembly 10 adjacent the first shaft 12 and prevents lateral movement of the first shaft 12 with respect to the housing 15 but allows pivotal movement about an axis extending through the universal joint and out of the view of FIG. 1. The bracket 13 pivots in an arc concentric with the slot 57 and arcuate bottom 59. A guide pin 61 extends into the arcuate slot 57 from the housing 15. The arcuate bottom 59 of bracket 13 includes notches 60. A lever 62 is pivotally mounted on the housing 15 and includes a tooth 64 for engaging one of the notches 60. The tooth 64 is held in one of the notches 60 by a spring 66 exerting force on the lever 62. The lever 62 may be manually moved out of engagement for pivotally adjusting the first shaft 12 or the steering wheel angularly with respect to the second shaft 28 by releasing the lever 62 which disengages the tooth 64 from a notch 60. The second shaft 28 is always held stationary with the support housing 15 so that the first shaft 12 can pivot. The angular movement accomplishes the tilting of the wheel. A spring 68 constantly urges the bracket 13 to pivot counter clockwise from the original position shown in FIG. 1.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A universal joint (10) for use in a steering wheel assembly (10), said assembly (10) comprising; a first shaft (12) having a first universal end (14), a second shaft (28) having a second universal end (30), said first universal end (14) including oppositely disposed faces (16) with a pin (20) extending from each of said faces (16), cap members (22) rotatably disposed on said pin (20) and in facing relationship to said faces (16) for allowing relative rotational movement about the axis of said pin (20) between said first shaft (12) and said cap members (22), each of said cap members (22) having a semi-circular periphery away from said faces (16) in the plane containing the axis of said pin (20) and including flat sides perpendicular to said faces (16) extending between said faces (16) and said semicircular peripheries, and socket members (34) clamped about said second universal end (30) of said second shaft (28) and including a circular pocket (36) disposed about said cap members (22) having flat bottoms (38) in sliding engagement with said flat sides of said cap member (22) for limiting movement of said cap members (22) in said plane relative to said socket members (34) so that universal movement occurs between said shafts (12, 28) as said circular cap members (22) rotate in said pocket (36) along with said pin (20) and relative rotation occurs about the axis of said pin (20) between said first shaft (12) and said cap members (22) at said faces (16), a fastener (50) connected between said socket members (34) within said pocket (36), and said cap members (22) having said semi-circular periphery extending beyond said first universal end (14) and including reliefs (26) extending away from said first universal end (14) therein for defining a clearance about said fastener (50) for allowing rotational movement of said cap members (22).

2. An assembly as set forth in claim 1 further characterized by said socket members (34) mating in a plane containing said axis of said pin (20).

3. An assembly as set forth in claim 2 further characterized by said first universal end (14) of said first shaft (12) having sides (17) extending laterally from said flat sides of said cap members (22), said socket members (34) defining an outwardly flared recess (40, 41) extending into the bottoms (38) of said circular pocket (36) to accommodate said sides of said first shaft (12) during rotational movement of said cap members (22) in said circular pocket (36).

4. An assembly as set forth in claim 3 further characterized by said socket members (34) presenting an upper surface (42), said circular pocket (36) intersecting and terminating at said upper surface (42) on a chord of the circle thereof for retaining said cap members (22) therein.

5. An assembly as set forth in claim 4 further characterized by said outwardly flared recess (40, 41) intersecting said upper surface (42) at the intersections (43) of said circular pocket (36) and said upper surface (42).

6. An assembly as set forth in claim 5 further characterized by including a second fastener (52) for independently connecting said socket members (34) to said second shaft (28).

7. An assembly as set forth in claim 6 further characterized by said socket means (34) including a first fastener hole (48), and said first fastener (50) extending through said socket members (34) at the bottoms (38) of said circular pockets (36).

8. An assembly as set forth in claim 7 further characterized by said socket members (34) including guide means (44, 46) for aligning said socket members (34) during assembly and preventing relative angular movement therebetween.

9. An assembly as set forth in claim 8 further characterized by said socket members (34) being identical in configuration.

10. An assembly as set forth in claim 9 further characterized by said guide means (44, 46) including a guide pin (44) disposed laterally of said pocket (36) of each socket member (34) and a guide hole (46) on the opposite side of each socket member (34) for receiving the guide pin (44) of the other socket member (34).

11. An assembly as set forth in claim 10 further characterized by first shaft (12) including a pin hole extending from one of said faces (16) to the other for supporting said pin (20) to extend away from each of said faces (16).

12. An assembly as set forth in claim 10 further characterized by said socket members (34) including a generally rectangular pocket (54) for receiving said second shaft (28).

13. An assembly as set forth in claim 12 further characterized by said second shaft (28) including a rectangular end (30) and a securing hole (32) extending through said rectangular end (54).

14. An assembly as set forth in claim 13 further characterized by said socket members (34) including second fastener holes (56) extending through said rectangular pocket (54), said second fastener (52) extending through said second fastener holes (56) and said securing hole (32).

15. An assembly as set forth in claim 14 further characterized by said rectangular pocket (54) and said rectangular end (30) of said second shaft (28) having mating rounded side surfaces (16) extending in the direction of said second fastener (52).

16. A universal joint assembly (10) for use in a steering wheel assembly (10), said assembly (10) comprising; a first shaft (12) having a first universal end (14), a second shaft (28) having a second universal end (30), said first universal end (14) including oppositely disposed faces (16) with a pin (20) extending from each of said faces (16), cap members (22) rotatably disposed on said pin (20) and in facing relationship to said faces (16) for allowing relative rotational movement about the axis of said pin (20) between said first shaft (12) and said cap members (22), said cap members (22) having a semi-circular periphery away from said faces (16) in a plane containing the axis of said pin (20), socket members (34) clamped about said second universal end (30) of said second shaft (28) and including a circular pocket (36) disposed about said cap members (22) for limiting movement of said cap members (22) in said plane relative to socket members (34) so that universal movement occurs between said shafts (12, 28) as said circular cap members (22) rotate in said pocket (36) along with said pin (20) and relative rotation occurs about the axis of said pin (20) between said first shaft (12) and said cap members (22) at said faces (16), fastener means (50) connected between said socket members (34) within said pocket (36), characterized by said cap members (22) having said semi-circular periphery extending beyond said first universal end (14) and including reliefs (26) extending away from said fastener (50) for allowing rotational movement of said cap members (22).

* * * * *